March 8, 1932.  A. B. HERRICK  1,848,480

ELECTRICAL RELAY

Filed April 25, 1924

INVENTOR.
Albert B. Herrick
BY
Fay, Oberlin + Fay
ATTORNEYS

Patented Mar. 8, 1932

1,848,480

UNITED STATES PATENT OFFICE

ALBERT B. HERRICK, OF RIVERSIDE, CONNECTICUT

ELECTRICAL RELAY

Application filed April 25, 1924. Serial No. 708,834.

The present improvements are based upon the discovery that when an alternating current arc, such as is produced by an induction coil, is passed between two adjacent but non-contacting surfaces, the resistance of the gap between such surfaces is broken down during such passage of the arc and as a result, a local circuit in which such gap normally forms a barrier section will be completed. In other words, current will flow in such local circuit between such adjacent surfaces forming the two sides of the gap during the existence of such a high tension arc which bridges such gap. Obviously, in order to utilize the foregoing principle, it is necessary that there be sufficient inductance in the local low tension circuit so that the high tension alternating arc will bridge the gap rather than pass around the same through the local shunting circuit.

The method thus discovered for closing a local circuit constitutes what may be aptly termed a frictionless relay contact and is susceptible of numerous practical applications, such for example as to control the movement of the steering wheel of a ship so that such movement will be in sympathy with the movement of a compass, or like instrument, which it has never heretofore been possible satisfactorily to employ for the control of a relay circuit because of the delicacy of the instrument and the disturbing effect which the introduction of even the slightest frictional resistance would have on its operation.

To the accomplishment of the foregoing and related ends, the invention, then, consists of the steps and means hereinafter fully described and particularly pointed out in the claim, the annexed drawings and the following description setting forth in detail one approved method of carrying out the invention, such disclosed mode, however, constituting but one of the various ways in which the principle of the invention may be used.

Figure 1:
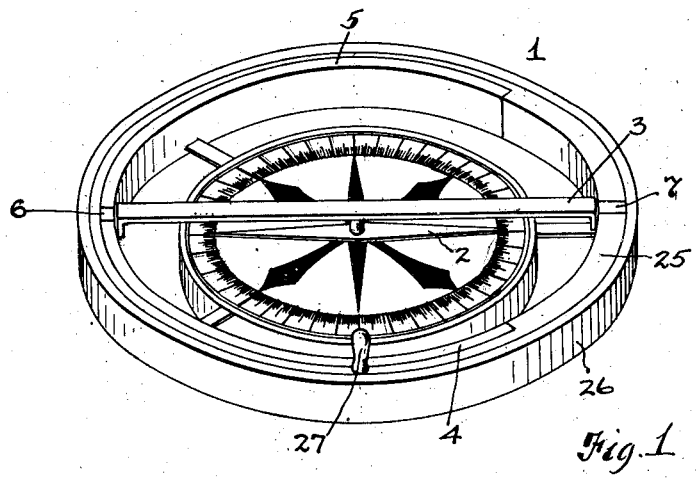
Figure 2:
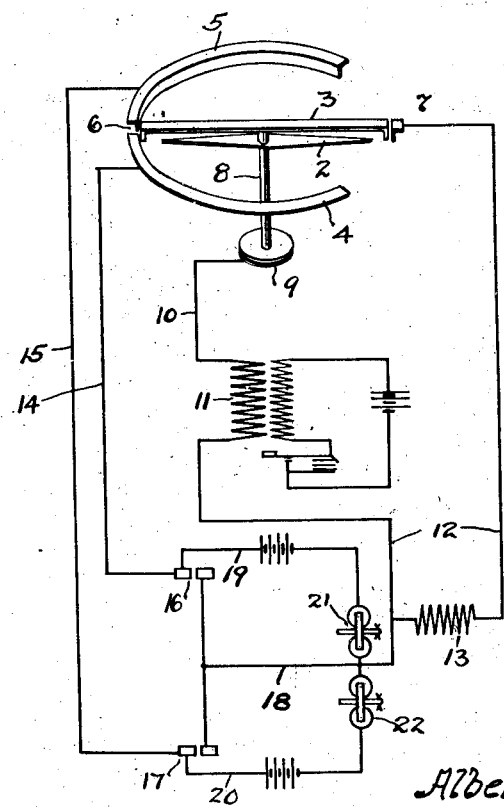

In said annexed drawings:

Fig. 1 is a perspective view, somewhat diagrammatic in character, of a ship's compass, having incorporated therewith a frictionless relay contact device operating in accordance with my improved method; and Fig. 2 is a diagram of the circuits and connections involved in the use of such device to control the steering of a ship or other like operation.

It will be understood, of course, that in thus illustrating my improved relay device in connection with a ship's compass and connected for the specific purpose of controlling the steering of such ship, it is not intended to imply that my improved relay system is limited to any such particular use, but the circuits thus shown are to be considered as typical of any relay circuit, whatever the character of the determining device that effects the flow of current in such circuit and whatever use be made of the relay proper.

It is well understood, of course, that it is desirable to cause the steering wheel of a ship to move in sympathy with the movement of the compass so that the ship may be automatically maintained on a predetermined course. Instead of a compass, a gyroscope or other equivalent device may constitute the direction giving agency, the essential part of the compass 1, so far as the present invention is concerned, being the magnetic needle 2. To the latter is attached a pointer 3 that swings conjointly with the needle, or in other words, such pointer follows the deviations of such needle at all times. Concentrically adjacent to the ends of such pointer 3 are two arcuate plates or bars 4 and 5, such plates each covering about 120 degrees of the compass scale and being insulated from each other, it being noted that two of the ends of such plates are only slightly separated, viz., at the point 6, the distance between the opposite ends being approximately equal to the remaining 120 degrees of the scale. Accordingly, when the pointer is symmetrically positioned with respect to the plates 4 and 5, its one end will be in line with the space 6 that separates their contiguous ends and in this position the opposite end of said pointer lies adjacent a contact segment 7. A slight gap, however, is left between such pointer end and contact 7 and a similar slight gap exists between the central downwardly extending portion 8 of the pointer and a second contact 9 in the bottom of the compass-containing case.

The path of the high tension current can be readily traced in Fig. 2 where it will be seen that one lead 10, composing such circuit, extends from one end of induction coil 11 to such contact 9, just referred to. Another lead 12, which includes the induction coil 13, extends from the other end of said coil 11 to contact 7 at the compass; while two other leads 14 and 15 extend from the plates 4 and 5 through gaps 16 and 17 to a common lead 18 that is connected with lead 12 between coils 11 and 13. In parallel with such common lead 18 are relay circuits 19 and 20, these being connected with leads 14 and 15 beyond gaps 16 and 17, so that such relay circuits are normally open. However, on the passage of current through one or the other of the gaps, the circuit will be completed through the corresponding relay 21 or 22, and such relay actuated.

Actuation of such relays may then be utilized to control a motor or other suitable mechanism, whereby the steering wheel of the ship may be turned in one direction or another to put the ship on the set course. This course is set by putting the ship on the proper course and while held on such course, the plate 25, that carries the concentric contacts 4 and 5, is turned in its holder 26 by means of a knob 27, provided for the purpose, until the needle stands at the neutral point 6 directly opposite the contact 7. The high tension current from coil 11 passes to the pointer through lead 10, jumps the gap between contacts 9 and 8, and from the pointer reaches the other side of the high tension circuit through contact 7, if the needle occupies the set position just described. However, if such needle veers to one side or the other from such set position, the high tension current, instead of passing from the pointer to contact 7, will pass therefrom to one or the other of the two segmental contacts 4 and 5. The high tension current thence will jump either across gap 16 or 17 on its return path to the induction coil and in so doing current in the corresponding relay circuit 19 or 20 will temporarily flow, as hereinbefore set forth.

As previously explained, the inductance of circuits 19 and 20 will be such that the high tension alternating arc will break through the gap 16 or 17 rather than pass around through such circuit.

The foregoing illustrates only one of many applications which may be made of my invention. As a result of the latter, a delicate electrical measuring instrument, for example, may be utilized to direct a high tension current without adding any friction or disturbing effect on the movement of such instrument, and in this way motors may be controlled for operating regulators or over-voltage switches, or for use in distantly controlled sub-stations. The invention may be used to equal advantage for transmitting time signals from clock hands. In all such cases the importance need not be emphasized of deriving the control for the operating mechanisms from independently moving elements without in any way adding friction or interfering with the indicating element of the instrument proper. In conclusion, it should be stated that the maximum sensibility of the device can be obtained by compensating the natural capacity and inductance of the circuits with artificial inductance and capacity to obtain the most sensitive adjustment, so the local circuit will instantly respond to changes in the high tension current.

Other modes of applying the principle of my invention may be employed instead of the one explained, change being made as regards the means and the steps herein disclosed, provided those stated by the following claim or their equivalents be employed.

I therefore particularly point out and distinctly claim as my invention:—

A frictionless circuit closer comprising a casing, an annular adjustable ring movable in said casing, a compass mounted in said casing, a pair of arcuate contact members of substantial length secured in said ring, and a third contact member secured in said ring substantially midway between the remote ends of said first two contact members, a metallic bar secured to the needle of said compass and having its ends slightly spaced from said ring, a shaft secured to said needle at its axis, wiring establishing a high tension circuit, one end of said wiring being connected to said third contact member and the opposite end thereof being secured to a terminal slightly spaced from the end of said shaft, and wiring establishing a pair of relay circuits, each complete save for an air gap, and each having one end connected to one of said first contact members, said high tension circuit being provided with a pair of branches and each of said branches including one of said air gaps.

Signed by me this 18th day of April, 1924.

ALBERT B. HERRICK.